(12) United States Patent
Kunz et al.

(10) Patent No.: US 9,586,486 B2
(45) Date of Patent: Mar. 7, 2017

(54) CONTROL UNIT FOR A RECUPERATIVE BRAKE SYSTEM OF A VEHICLE AND METHOD FOR BRAKING A VEHICLE

(71) Applicant: Robert Bosch GmbH, Stuttgart (DE)

(72) Inventors: Michael Kunz, Steinheim An der Murr (DE); Stefan Strengert, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 130 days.

(21) Appl. No.: 14/271,651

(22) Filed: May 7, 2014

(65) Prior Publication Data
US 2014/0333123 A1 Nov. 13, 2014

(30) Foreign Application Priority Data

May 13, 2013 (DE) .................. 10 2013 208 703

(51) Int. Cl.
| | |
|---|---|
| B60T 13/58 | (2006.01) |
| B60L 7/26 | (2006.01) |
| B60T 8/40 | (2006.01) |
| B60L 7/18 | (2006.01) |
| B60T 13/74 | (2006.01) |

(52) U.S. Cl.
CPC ...... B60L 7/26 (2013.01); B60L 7/18 (2013.01); B60T 8/4072 (2013.01); B60T 13/586 (2013.01); B60T 13/745 (2013.01)

(58) Field of Classification Search
CPC ..... B60T 13/586; B60T 13/745; B60T 8/4072
See application file for complete search history.

(56) References Cited

U.S. PATENT DOCUMENTS

| | | | | |
|---|---|---|---|---|
| 4,962,969 A * | 10/1990 | Davis | ................. | B60T 8/00 188/156 |
| 5,378,053 A * | 1/1995 | Patient | ................. | B60K 28/16 188/156 |
| 6,412,882 B1 * | 7/2002 | Isono | ................. | B60K 6/22 303/11 |
| 6,457,784 B1 * | 10/2002 | Bohm | ................. | B60K 6/48 303/155 |
| 7,497,285 B1 * | 3/2009 | Radev | ................. | B60K 6/26 180/65.225 |
| 8,931,856 B2 * | 1/2015 | Okano | ................. | B60T 1/10 303/15 |

(Continued)

Primary Examiner — Thomas J Williams
Assistant Examiner — James Hsiao
(74) Attorney, Agent, or Firm — Gerard Messina

(57) ABSTRACT

A control device for a recuperative braking system of a vehicle includes: an actuating device configured to (i) select the maximum value of a front axle generator braking torque and of a rear axle generator braking torque, taking into account at least one provided default variable concerning a setpoint total braking torque which is predefined by a driver, (ii) control an electric motor, and (iii) control a hydraulic front axle brake circuit component and a hydraulic rear axle brake circuit component in such a way that a front axle brake pressure and a rear axle brake pressure are settable in such a way that a difference between a predefined setpoint braking torque distribution and an actual braking torque distribution present between the front axle and the rear axle is minimized.

16 Claims, 2 Drawing Sheets

(56) References Cited

U.S. PATENT DOCUMENTS

| | | | |
|---|---|---|---|
| 2003/0062770 A1* | 4/2003 | Sasaki | B60T 8/00 303/152 |
| 2004/0046448 A1* | 3/2004 | Brown | B60K 6/44 303/152 |
| 2008/0093179 A1* | 4/2008 | Jager | B60L 7/22 188/72.2 |
| 2008/0100129 A1* | 5/2008 | Lubbers | B60K 6/48 303/113.1 |
| 2011/0192661 A1* | 8/2011 | Hennings | B60T 1/10 180/65.21 |
| 2012/0190499 A1* | 7/2012 | Oba | B60W 10/16 477/115 |
| 2013/0297164 A1* | 11/2013 | Lauffer | B60T 1/10 701/70 |
| 2014/0028083 A1* | 1/2014 | Gerdes | B60T 1/10 303/6.01 |

* cited by examiner

#  CONTROL UNIT FOR A RECUPERATIVE BRAKE SYSTEM OF A VEHICLE AND METHOD FOR BRAKING A VEHICLE

BACKGROUND OF THE INVENTION

1. Field of the Invention

The present invention relates to a control device for a recuperative braking system of a vehicle. Moreover, the present invention relates to a recuperative braking system for a vehicle. Furthermore, the present invention relates to a method for decelerating a vehicle.

2. Description of the Related Art

A control device for a braking system of a vehicle and a method for operating a braking system of a vehicle are described in published German patent application document DE 10 2011 075 968 A1. According to the subject matter of published German patent application document DE 10 2011 075 968 A1, a vehicle is decelerated in that a front axle generator braking torque is exerted on a front axle of the vehicle with the aid of an electric motor.

BRIEF SUMMARY OF THE INVENTION

With the aid of the present invention, it is possible to utilize the front axle as well as the rear axle of the vehicle in order to convert kinetic energy into electrical energy during a deceleration. This allows more rapid charging of a vehicle battery, a significant reduction in fuel consumption of the vehicle, and a considerable decrease in the pollutant emissions of the vehicle during travel. At the same time, when carrying out the present invention it is ensured that the vehicle deceleration predefined by the driver/the predefined setpoint total braking torque is not exceeded. In addition, despite the deceleration in generator mode of the front axle and the rear axle at the same time, an actual braking torque distribution is achievable which comes as close as possible to the desired/advantageous setpoint braking torque distribution. Thus, even when the front axle and the rear axle are decelerated at the same time, good vehicle stability is ensured with the aid of the at least one electric motor.

As explained in greater detail below, the present invention also allows an increase in conventional options for adapting a hydraulic pressure in wheel brake cylinders to at least one generator braking torque which has just been provided, in that the hydraulic pressure is customarily reducible only simultaneously in all wheel brake cylinders acting on the vehicle axles. The present invention thus eliminates the limiting of the regenerative efficiency during blending, using a drive train according to the related art.

The present invention in particular allows setting of a front axle brake pressure in the at least one front axle wheel brake cylinder of the front axle brake circuit, and of a rear axle brake pressure, which differs therefrom, in the at least one rear axle wheel brake cylinder of the rear axle brake circuit. In other words, the hydraulic pressures at the front axle and at the rear axle are independently settable. This may be utilized to ensure the best possible maintenance of the setpoint braking torque distribution and a desired vehicle stability.

In one advantageous specific embodiment, the actuating device is designed to establish the front axle brake pressure which is settable in the front axle brake circuit, and the rear axle brake pressure which is settable in the rear axle brake circuit, in such a way that the difference between the predefined setpoint braking torque distribution and an actual braking torque distribution which is present between the front axle and the rear axle, as the quotient of a total front axle braking torque exerted on the front axle, including the front axle generator braking torque and a front axle friction braking torque exerted on the front axle with the aid of at least one front axle wheel brake cylinder, and a total rear axle braking torque exerted on the rear axle, including the rear axle generator braking torque and a rear axle friction braking torque exerted on the rear axle with the aid of at least one rear axle wheel brake cylinder, is minimizable. A desired vehicle stability may be maintained in this way for many braking situations.

In another advantageous specific embodiment, the actuating device is designed to control at least one electromechanical plunger of the front axle brake circuit and/or of the rear axle brake circuit, as the at least one hydraulic front axle brake circuit component and/or the at least one hydraulic rear axle brake circuit component, with the aid of the at least one hydraulic control signal. The front axle brake pressure and/or the rear axle brake pressure may thus be selectively increased or decreased with the aid of the at least one electromechanical plunger. In addition, the use of the at least one electromechanical plunger, which is ensured with the aid of the specific embodiment of the actuating device described here, allows this advantage without a design of the brake circuit equipped in this way as a decoupleable brake circuit. Accordingly, the driver still has the option at any time to brake the at least one brake circuit which is equipped with the at least one electromechanical plunger.

Likewise, the actuating device may be designed to control at least one shutoff valve of the front axle brake circuit and/or of the rear axle brake circuit via which the front axle brake circuit and/or the rear axle brake circuit is/are connected to a main brake cylinder of the braking system, as the at least one hydraulic front axle brake circuit component and/or the at least one hydraulic rear axle brake circuit component, with the aid of the at least one hydraulic control signal. Thus, the pressure that is present in the front axle brake circuit and/or the rear axle brake circuit may be set in a relatively free manner by selectively closing the at least one shutoff valve. This allows reliable blending of the generator braking torques, even when they fluctuate greatly over time.

Alternatively or additionally, the actuating device may also be designed to control at least one pressure relief valve of the front axle brake circuit and/or of the rear axle brake circuit via which the front axle brake circuit and/or the rear axle brake circuit is/are connected to a brake fluid reservoir of the braking system, as the at least one hydraulic front axle brake circuit component and/or the at least one hydraulic rear axle brake circuit component, with the aid of the at least one hydraulic control signal. The front axle brake pressure and/or the rear axle brake pressure may thus be rapidly reduced by opening the at least one pressure relief valve.

Furthermore, the actuating device may be designed to control at least one pump of the front axle brake circuit and/or of the rear axle brake circuit, with the aid of which brake fluid is pumpable from the brake fluid reservoir into the front axle brake circuit and/or the rear axle brake circuit, as the at least one hydraulic front axle brake circuit component and/or the at least one hydraulic rear axle brake circuit component, with the aid of the at least one hydraulic control signal. A rapid increase in the front axle brake pressure and/or the rear axle brake pressure may thus be carried out with the aid of the control device in order to ensure the best possible vehicle stability.

In another advantageous specific embodiment, the actuating device is designed to control a shared generator of the front axle and of the rear axle, as the at least one electric motor, with the aid of the at least one motor control signal. In particular, the control device also allows the use of a generator which acts differently on multiple vehicle axles. Thus, for example, four-wheel drive vehicles having variable torque distribution are implementable with advantageous stability with the aid of the present invention.

Alternatively or additionally, the actuating device may also be designed to control at least one front axle generator of the front axle and at least one rear axle generator of the rear axle, as the at least one electric motor, with the aid of the at least one motor control signal. The present invention may thus also be carried out for recovering kinetic energy, using multiple generators on different vehicle axles.

The above-mentioned advantages are also ensured in a corresponding recuperative braking system for a vehicle having this type of control device. The present invention therefore also encompasses a recuperative braking system which eliminates the disadvantages of conventional blending systems, and which may be used with the requirements for use of a generator having a different action on the vehicle axles, or use of multiple generators.

In one advantageous specific embodiment, the braking system includes the front axle brake circuit, which is non-decoupleably connected to the main brake cylinder of the braking system, together with at least one electromechanical plunger as the at least one front axle brake circuit component, and the rear axle brake circuit, which is connected to the main brake cylinder via a shutoff valve as the at least one rear axle brake circuit component, and is decoupleably connected to a brake fluid reservoir of the braking system via a pressure relief valve as the at least one rear axle brake circuit component. As explained in greater detail below, in particular this braking system, which represents a combination of an active volume store and a changeable ESP system, ensures the advantages described above. The braking system eliminates the disadvantage of the blending systems according to the related art with regard to the limited recuperative efficiency, and in particular may be used with the requirements for multiple generators or one generator having a different action on the vehicle axles.

The advantages explained above may also be achieved by carrying out the corresponding method for decelerating a vehicle. The method for decelerating a vehicle may be refined according to the specific embodiments of the control device and of the recuperative braking system explained above.

DETAILED DESCRIPTION OF THE INVENTION

Figure 1:
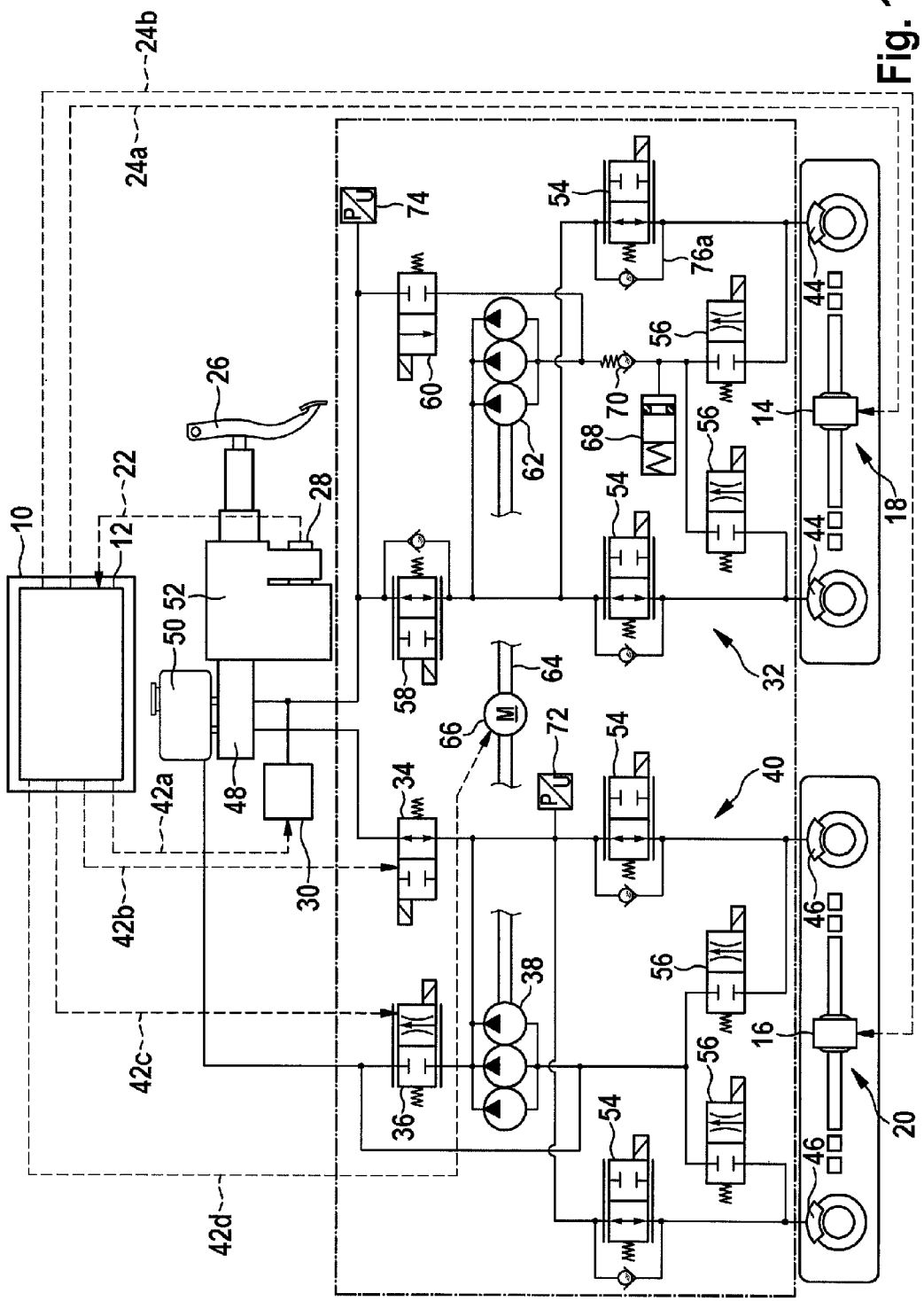
FIG. 1 shows a schematic illustration of specific embodiments of the control device and a recuperative braking system thus equipped.

FIG. 1 shows a schematic illustration of specific embodiments of the control device and a recuperative braking system thus equipped.

Control device 10 schematically illustrated in FIG. 1 is usable together with the recuperative braking system for a vehicle, likewise depicted. However, it is pointed out that the further statements concerning the braking system which cooperates with control device 10 are to be interpreted strictly as an example. Usability of control device 10 is not limited to this type of recuperative braking system.

The braking system or control device 10 illustrated in FIG. 1 is advantageously usable in particular in a hybrid vehicle or an electric vehicle. However, the usability of the braking system/control device 10 is not limited to a certain type of vehicle.

Control device 10 includes an actuating device 12 which is designed to control at least one electric motor 14 and 16 of the vehicle in such a way that at least a front axle generator braking torque may be applied to a front axle 18 of the vehicle with the aid of the at least one electric motor 14 and 16. In particular, actuating device 12 is designed to select the maximum front axle generator braking torque which may be applied to front axle 18 with the aid of the at least one electric motor 14 and 16, and at the same time, to select the maximum rear axle generator braking torque which may be applied to a rear axle 20 of the vehicle with the aid of the at least one electric motor 14 and 16, taking into account at least one provided default variable 22. In addition, actuating device 12 is designed to appropriately control the at least one electric motor 14 and 16 with the aid of at least one motor control signal 24a and 24b, respectively (corresponding to the selected front axle generator braking torque and the selected rear axle generator braking torque, respectively). The at least one electric motor 14 and 16 preferably exerts the selected front axle generator braking torque on front axle 18, and at the same time exerts the selected rear axle generator braking torque on rear axle 20.

The provided default variable 22 is a default variable 22 concerning a setpoint total braking torque which is predefined by a driver. For example, default variable 22 may be provided by a sensor 28 which is mounted on or near a brake actuating element 26. Default variable 22 includes, for example, a brake actuation travel, such as in particular a rod travel, pedal travel, and/or a differential travel, a driver brake force, and/or a driver brake pressure. A rod travel sensor, a pedal travel sensor, a differential travel sensor, a driver brake force sensor, and/or a driver brake pressure sensor may be used as sensor 28 for providing this type of default variable 22. It is also pointed out that other variables which reflect a driver braking input may also be taken into account as default variable 22, and/or other types of sensors may be used for sensor 28.

Selecting the maximum front axle generator braking torque and the maximum rear axle generator braking torque may be understood to mean that the front axle generator braking torque, and at the same time the rear axle generator braking torque, to be exerted are set at a maximum without (significantly) exceeding a setpoint total braking torque which corresponds to default variable 22. Values for the front axle generator braking torque to be exerted and for the rear axle generator braking torque to be exerted at the same time are thus preferably settable to be as large as possible with the aid of actuating device 12, a sum of the maximum set front axle generator braking torque and of the maximum set rear axle generator braking torque still being less than or equal to the setpoint total braking torque which corresponds to default variable 22. As described below in greater detail, when the front axle generator braking torque and the rear axle generator braking torque are selected to be maximum values, at least one instantaneous maximum achievable optional generator braking torque may also be taken into account, in addition to default variable 22, by actuating device 12 with the aid of the at least one generator 14 and 16.

Actuating device 12 is also designed to control at least one hydraulic front axle brake circuit component 30 of a front axle brake circuit 32 associated with front axle 18, and at least one hydraulic rear axle brake circuit component 34 through 38 of a rear axle brake circuit 40 associated with rear axle 20 with the aid of at least one hydraulic control signal 42a through 42d, taking at least default variable 22 into account. Components 30 and 34 through 38 are controlled in such a way that a front axle brake pressure in front axle brake circuit 32 and a rear axle brake pressure in rear axle brake circuit 40 are settable in such a way that a difference between a predefined setpoint braking torque distribution and an actual braking torque distribution which is present between front axle 18 and rear axle 20 is minimizable.

Setting the front axle brake pressure and the rear axle brake pressure in such a way that the difference between the setpoint braking torque distribution and the actual braking torque distribution is minimizable may be understood to mean that pressures for the front axle brake pressure and the rear axle brake pressure are achievable in which the absolute value of the difference becomes preferably small. For example, with the aid of actuating device 12, setpoint pressures for the front axle brake pressure and the rear axle brake pressure are settable/ascertainable in which the absolute value of the difference is as small as possible. In particular, actuating device 12 may be designed to keep the actual braking torque distribution/actual brake force distribution unchanged during the regenerative braking, and/or to keep same identical to the (installed) setpoint brake force distribution/setpoint braking torque distribution, provided this is possible. (It is pointed out that, instead of preferably maintaining the setpoint braking torque distribution precisely, a setpoint brake force distribution may also correspondingly be maintained preferably precisely.) When setting the front axle brake pressure and the rear axle brake pressure, actuating device 12 also preferably takes at least default variable 22 into account in such a way that a setpoint total braking torque which corresponds to default variable 22 is not (significantly) exceeded. In this way, maintaining default variable 22 may be prioritized with respect to maintaining the setpoint brake force distribution/setpoint braking torque distribution; i.e., actuating device 12 maintains the setpoint brake force distribution/setpoint braking torque distribution only as long as the sum of the braking torques exerted with the aid of the at least one electric motor 14 and 16 and brake circuits 32 and 40 is (approximately) equal to the setpoint total braking torque which corresponds to default variable 22.

Due to the advantageous design of control device 10 for the combined operation of the at least one electric motor 14 and 16 and hydraulic components 30 and 34 through 38 of the various brake circuits 32 and 40, it is possible to execute the driver braking input regeneratively to a preferably great extent, and at the same time to maintain the predefined setpoint braking torque distribution as precisely as possible.

In particular, control device 10 allows the use of hydraulic components 30 and 34 through 38 of the various brake circuits 32 and 40 as mutually independent hydraulic actuators, with the aid of which the actual braking torque distribution/actual brake force distribution is advantageously settable during the regenerative braking action. This guarantees optimal driving comfort and good vehicle stability, even during a blending operation between purely hydraulic braking, hydraulic regenerative braking, or purely regenerative braking. The use of the at least one electric motor 14 and 16, which takes place during this type of blending operation, for simultaneously exerting the front axle generator braking torque on front axle 18 and exerting the rear axle generator braking torque on rear axle 20 does not have an interfering effect. This is ensured even when the at least one electric motor 14 and 16 has different effects on axles 18 and 20.

In the specific embodiment in FIG. 1, actuating device 12 is designed to control at least one front axle generator 14 of front axle 18 and at least one rear axle generator 16 of rear axle 20, as the at least one electric motor 14 and 16, with the aid of the at least one motor control signal 24a and 24b. Since actuating device 12 at the same time is able to control a pressure reduction in a brake circuit 32 or 40 and a pressure build-up in the respective other brake circuit 32 or 40, a targeted response to different changes in the generator braking torques is possible.

However, actuating device 12 may alternatively or additionally be designed to control a shared generator of front axle 18 and rear axle 20, as the at least one electric motor 14 and 16, with the aid of the at least one motor control signal 24a and 24b. Even a shared generator having a different action on axles 18 and 20 may be operable with the aid of control device 10. When a shared generator is used, the different action on axles 18 and 20 may be compensated for by pressure reductions or pressure build-ups of different magnitudes. (Simultaneously carrying out a pressure build-up on one axle 18 or 20 and a pressure reduction on other axle 18 or 20 is not necessary when a shared generator is used, since the shared generator always effects, via the transmission, a rectified change in the generator braking torques, although not necessarily of the same magnitude.)

Actuating device 12 is preferably designed to establish the front axle brake pressure which is settable in front axle brake circuit 32, and the rear axle brake pressure which is settable in rear axle brake circuit 40, in such a way that the difference between the predefined setpoint braking torque distribution and an actual braking torque distribution which is present between front axle 18 and rear axle 20, as the quotient of a total front axle braking torque exerted on front axle 18 and a total rear axle braking torque exerted on the rear axle, is minimizable. The total front axle braking torque may include the front axle generator braking torque and a front axle friction braking torque (directly or indirectly) exerted on front axle 18 with the aid of at least one front axle wheel brake cylinder 44 of front axle brake circuit 32. Similarly, the total rear axle braking torque may include the rear axle generator braking torque and a rear axle friction braking torque (directly or indirectly) exerted on rear axle 20 with the aid of at least one rear axle wheel brake cylinder 46 of rear axle brake circuit 40.

When controlling the at least one electric motor 14 and 16, actuating device 12 preferably also takes into account at least one instantaneous maximum achievable optional generator braking torque with the aid of the at least one electric motor 14 and 16. During regenerative braking with the aid of the at least one electric motor 14 and 16, a generator braking torque which is known but not constant acts on associated axles 18 and 20. The respective generator braking torques of the different axles 18 and 20 usually have different magnitudes. This is due either to a different design of the axle-specific drive trains, or due to the transmission, which carries out the distribution of the generator braking torques of a shared generator to axles 18 and 20. In addition, temporal fluctuations generally occur in the at least one instantaneous maximum achievable optional generator braking torque. Use of the at least one electric motor 14 and 16 may be dispensed with, in particular intermittently, if the vehicle battery is fully charged or a speed of the vehicle is below a minimum speed for using the generator. However, actuating device 12 is preferably designed to set the generator braking torques of axles 18 and 20 at a maximum, taking into account default variable 22 and the at least one instantaneous maximum achievable optional generator braking torque, and to individually compute the brake pressures for each axle 18 and 20 which are necessary for reliably maintaining the driver braking input and for preferably precisely maintaining the predefined setpoint braking torque distribution.

Control device 10 may thus respond individually to the at least one instantaneous maximum achievable optional generator braking torque for each axle 18 and 20, and appropriately adapt the particular brake pressure/the particular friction braking torque. It is even possible at the same time to achieve a pressure reduction at one axle 18 or 20 and a pressure build-up at other axle 18 or 20. There is little or no change in the braking torque distribution during a transition from purely regenerative braking to regenerative hydraulic braking, or during a transition from regenerative hydraulic braking to purely hydraulic braking. This is a significant advantage over conventional blending systems. The vehicle thus behaves as a conventional purely hydraulic braking vehicle at any time during operation.

In the specific embodiment in FIG. 1, actuating device 12 is designed to control at least one electromechanical plunger 30 of front axle brake circuit 32 as the at least one hydraulic front axle brake circuit component 30 with the aid of the at least one hydraulic control signal 42a. However, at least one electromechanical plunger of rear axle brake circuit 40 may also similarly be controllable by actuating device 12 as a further hydraulic rear axle brake circuit component.

In the specific embodiment in FIG. 1, front axle brake circuit 32 is designed as a brake circuit which is undecoupleable from a main brake cylinder 48. In other words, front axle brake circuit 32 is directly coupled to brake actuating element 26, such as a brake pedal 26. Thus, the driver may always directly brake front axle brake circuit 32, for which reason a driver brake force exerted on brake actuating element 26 is preferably taken into account when setting the front axle brake pressure. When the electromechanical plunger 30 is not actuated, the front axle brake pressure is established by actuation of brake actuating element 26 by the driver, and by an associated volume displacement from main brake cylinder 48 into front axle brake circuit 32. However, this displaced volume may be selectively accommodated, at least partially, with the aid of electromechanical plunger 30. Thus, despite the actuation of brake actuating element 26 by the driver, the front axle brake pressure in the at least one front axle wheel brake cylinder 44 may be reduced/completely eliminated. Optionally, this type of reduction/elimination of the front axle brake pressure takes place in order to adapt the front axle friction braking torque to the front axle generator braking torque for accurately maintaining default variable 22 and/or for preferably reliably maintaining the predefined setpoint braking torque.

In addition, actuating device 12 of control device 10 in FIG. 1 is designed to control a shutoff valve 34 of rear axle brake circuit 40, via which rear axle brake circuit 40 is connected to main brake cylinder 48 as the at least one hydraulic rear axle brake circuit component 34 through 38, with the aid of the at least one hydraulic control signal 42b. Likewise, with the aid of the at least one hydraulic control signal 42c a pressure relief valve 36 of rear axle brake circuit 40, via which rear axle brake circuit 40 is connected to a brake fluid reservoir 50, is controllable as the at least one hydraulic rear axle brake circuit component 34 through 38.

Furthermore, at least one pump 38 of rear axle brake circuit 40, with the aid of which brake fluid is pumpable from brake fluid reservoir 50 into rear axle brake circuit 40, may be controlled as the at least one hydraulic rear axle brake circuit component 34 through 38, with the aid of the at least one hydraulic control signal 42d. (Alternatively or additionally, a shutoff valve of front axle brake circuit 32, a pressure relief valve of front axle brake circuit 32 appropriately connected to brake fluid reservoir 50, and/or at least one pump of front axle brake circuit 32 which is usable in this way may be controllable with the aid of the at least one hydraulic control signal 42a through 42d.)

Rear axle brake circuit 40 illustrated in FIG. 1 is thus designed as a brake circuit which is decoupleable from main brake cylinder 48. Shutoff valve 34 may be closed during an actuation of brake actuating element 26 by the driver. This results in two completely separate brake circuits 32 and 40, braking of rear axle brake circuit 40 by the driver by closing shutoff valve 34 being prevented. In this case, the two brake circuits 32 and 40 have separate actuator systems for regenerative braking and for independently setting the brake pressures present therein. In particular rear axle brake circuit 40 is advantageously usable for blending after decoupling from main brake cylinder 48. With the aid of pressure relief valve 36 and/or the at least one pump 38, the rear axle brake pressure may be set as a function of default variable 22 and/or the maximal available regenerative braking torque of rear axle generator 16. If it is possible for the driver braking input to be carried out completely by rear axle generator 16, for example, no pressure build-up takes place in the rear axle brake circuit. If the rear axle generator braking torque of rear axle generator 16 is reduced, or if the rear axle generator braking torque is not sufficient for completely carrying out the driver braking input, the rear axle friction braking torque may be increased by operating the at least one pump 38. In this case, the at least one pump 38 draws in enough hydraulic volume from brake fluid reservoir 50 and displaces it into the at least one rear axle wheel brake cylinder 46 so that the driver braking input continues to be reliably carried out. In addition, brake fluid may be drawn back into brake fluid reservoir 50 by opening pressure relief valve 36, so that the rear axle brake pressure which is present in the at least one rear axle wheel brake cylinder 46 is also reducible. In particular in a design of pressure relief valve 36 as a continuously regulatable/controllable valve, free settability of the rear axle brake pressure is achieved.

Due to the advantageous decoupleability of rear axle brake circuit 40 by closing shutoff valve 34, the braking system in FIG. 1 may have a main brake cylinder 48 with a reduced main brake cylinder diameter. Since the driver generally brakes only front axle brake circuit 32 with the aid of brake actuating element 26, and the brake reaction/pedal reaction thus results only from front axle brake circuit 32, the required volume displacement and the driver brake force necessary for same are reduced by a portion which is otherwise present for braking rear axle brake circuit 40. This allows use of a main brake cylinder 48 having a relatively small diameter, and at the same time allows a reduction in an assisting force of an optional brake booster 52, which is advantageous for force-based assistance of the driver. Since in the advantageous braking system, rear axle brake circuit 40 is autonomously supplied with the aid of its at least one pump 38, a brake booster 52 which is less expensive and comparatively smaller may be used in the braking system. Brake booster 52 may be an electromechanical brake booster 52, for example, whose advantageous further use is described in greater detail below. However, it is pointed out that the braking system described here is also usable without a brake booster 52, or with some other type of brake booster.

In most cases, a reduction in the main brake cylinder diameter also has a positive effect on a purely hydraulic fallback level, for example in the case of an electrical malfunction of the vehicle electrical system. In this case, shutoff valve 34 remains open, and the driver may displace volumes into both brake circuits 32 and 40 by actuating brake actuating element 36. Due to the comparatively small main brake cylinder diameter, with the aid of a comparatively small force (500 N, for example) the driver may achieve high friction braking torques (at least corresponding to regulatory requirements).

In one advantageous refinement, control device 10 may also be designed for controlling electromechanical brake booster 52. In particular, the assisting force which is provided with the aid of electromechanical brake booster 52 may be adapted to a changed internal pressure in main brake cylinder 48 due to resetting at least the front axle brake pressure. For example, when the internal pressure in main brake cylinder 48 is reduced, the assisting force may also be decreased in such a way that the driver does not perceive a pressure drop in main brake cylinder 48. Similarly, when the internal pressure in main brake cylinder 48 is increased with the aid of a greater assisting force, it is possible for the driver to not perceive the additional pressure build-up in main brake cylinder 48. Thus, the driver does not notice either an additional use of the at least one electric motor 14 and 16 due to the reliable maintaining of the vehicle deceleration, or a blending operation due to the changed brake actuation feel (pedal feel).

The braking system illustrated in FIG. 1 has one wheel inlet valve 54 and one wheel outlet valve 56 in each case for each wheel brake cylinder 44 and 46. In addition, front axle brake circuit 32 has a changeover valve 58 and a high-pressure switching valve 60. The at least one pump 38 of rear axle brake circuit 40 together with at least one pump 62 of front axle brake circuit 32 is situated on a shared shaft 64 of a motor 66. The braking system illustrated in FIG. 1 is designed as a six-piston ESP system. However, modulation systems having another design, such as pumps having multiple pistons, or asymmetrical pumps, and/or gear pumps are usable together with control device 10.

Front axle brake circuit 32 also has a low-pressure storage chamber 68, a pressure relief valve 70 being situated between low-pressure storage chamber 68 and a suction side of the at least one pump 62. With regard to further particulars of the braking system in FIG. 1, reference is made to DE 10 2011 075 968 A1. It is pointed out that control device 10 may also be designed to control at least one additional valve 54 through 60. Control device 10 may in particular be integrated into a braking system control system or into a central vehicle control system. Control device 10 may likewise be a dedicated structural unit.

Each of brake circuits 32 and 40 may be equipped with at least one pressure sensor 72 and/or at least one brake pressure sensor 74. Sensor signals provided by pressure sensors 72 and 74 may also be evaluated by control device 10/actuating device 12.

Figure 2:
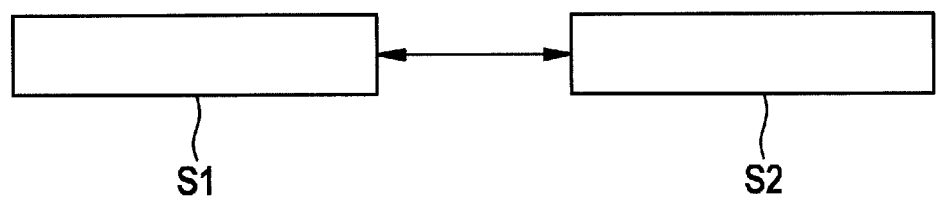
FIG. 2 shows a flow chart for explaining one specific embodiment of the method for decelerating a vehicle.

FIG. 2 shows a flow chart for explaining one specific embodiment of the method for decelerating a vehicle.

The method described below may be carried out, for example, with the aid of the control device explained above and/or a braking system which is equipped with same. However, it is pointed out that the implementability of the method is not limited to the use of the above-described control device and/or the braking system.

In the method, at least a front axle of the vehicle is decelerated with the aid of at least one front axle generator braking torque which is applied by at least one electric motor. To this end, the method has at least method steps S1 and S2.

In method step S1, the at least one electric motor is operated in generator mode for exerting the front axle generator braking torque on the front axle, and at the same time, for exerting a rear axle generator braking torque on a rear axle of the vehicle. For operating the at least one electric motor in generator mode, the front axle generator braking torque and the rear axle generator braking torque are selected at a maximum, taking into account at least one setpoint total braking torque which is predefined by a driver of the vehicle.

In carrying out method step S1, a shared generator of the front axle and the rear axle may be operated as the at least one electric motor for exerting the front axle generator braking torque on the front axle, and at the same time, for exerting the rear axle generator braking torque on the rear axle. Likewise, at least a front axle generator of the front axle and at least a rear axle generator of the rear axle, as the at least one electric motor, may be operated at the same time for carrying out method step S1.

A front axle brake pressure in a front axle brake circuit associated with the front axle, and a rear axle brake pressure in a rear axle brake circuit associated with the rear axle, are set in method step S2. This takes place in such a way that a difference between the predefined setpoint braking torque distribution and an actual braking torque distribution which is present between the front axle and the rear axle is minimized.

For carrying out method step S2, the front axle brake pressure which is set in the front axle brake circuit, and the rear axle brake pressure which is set in the rear axle brake circuit, are preferably established in such a way that the difference between the predefined setpoint braking torque distribution and an actual braking torque distribution which is present between the front axle and the rear axle, as the quotient of a total front axle braking torque exerted on the front axle (including the front axle generator braking torque and a front axle friction braking torque which is exerted on the front axle with the aid of at least one front axle wheel brake cylinder) and a total rear axle braking torque which is exerted on the rear axle (including the rear axle generator braking torque and a rear axle friction braking torque which is exerted on the rear axle with the aid of at least one rear axle wheel brake cylinder) is minimized.

In one preferred specific embodiment of the method, the front axle brake pressure in the front axle brake circuit, which is non-decoupleably connected to a main brake cylinder of the braking system, is set with the aid of at least one electromechanical plunger of the front axle brake circuit, and/or the rear axle brake pressure in the rear axle brake circuit, which is decoupleably connected to the main brake cylinder via a shutoff valve, is set with the aid of a pressure relief valve of the rear axle brake circuit, via which the rear axle brake circuit is connected to a brake fluid reservoir of the braking system, and/or with the aid of at least one pump of the rear axle brake circuit, with the aid of which brake fluid is pumped from the brake fluid reservoir into the rear axle brake circuit.

The method described here ensures the advantages already described above, which therefore are not repeated here.

What is claimed is:

1. A control device for a recuperative braking system of a vehicle, comprising:
an actuating device configured to:
control at least one electric motor of the vehicle, taking into account at least one provided default variable concerning a setpoint total braking torque which is predefined by a driver, in such a way that at least a front axle generator braking torque is applied to a front axle of the vehicle with the aid of the at least one electric motor;
select the maximum permissible front axle generator braking torque which may be applied to the front axle with the aid of the at least one electric motor, and select the maximum permissible rear axle generator braking torque which may be applied to a rear axle of the vehicle with the aid of the at least one electric motor, taking into account at least the default variable, and control the at least one electric motor with the aid of at least one motor control signal to perform a regenerative braking; and
control at least one hydraulic front axle brake circuit component of a front axle brake circuit associated with the front axle, and control at least one hydraulic rear axle brake circuit component of a rear axle brake circuit associated with the rear axle, with the aid of at least one hydraulic control signal and in conjunction with the regenerative braking, in such a way that a front axle brake pressure in the front axle brake circuit and a rear axle brake pressure in the rear axle brake circuit are set in such a way that a difference between (i) a predefined setpoint braking torque distribution and (ii) an actual braking torque distribution present between the front axle and the rear axle is minimized, wherein the actuating device is configured to maintain the setpoint braking torque distribution during the regenerative braking;
wherein the actuating device is configured to select the maximum permissible front axle generator braking torque and the maximum permissible rear axle generator braking torque such that a sum of the maximum permissible front axle generator braking torque and the maximum permissible rear axle generator braking torque is less than or equal to the setpoint total braking torque.

2. The control device as recited in claim 1, wherein each of the predefined setpoint braking torque distribution and the actual braking torque distribution present between the front axle and the rear axle represents a quotient of (i) a total front axle braking torque exerted on the front axle including the front axle generator braking torque and a front axle friction braking torque exerted on the front axle with the aid of at least one front axle wheel brake cylinder, and (ii) a total rear axle braking torque exerted on the rear axle including the rear axle generator braking torque and a rear axle friction braking torque exerted on the rear axle with the aid of at least one rear axle wheel brake cylinder.

3. The control device as recited in claim 2, wherein the at least one hydraulic front axle brake circuit component is at least one electromechanical plunger of the front axle brake circuit, and wherein the at least one hydraulic rear axle brake circuit component is at least one electromechanical plunger of the rear axle brake circuit.

4. The control device as recited in claim 2, wherein the at least one hydraulic front axle brake circuit component is at least one shutoff valve of the front axle brake circuit via which the front axle brake circuit is connected to a main brake cylinder of the braking system, and wherein the at least one hydraulic rear axle brake circuit component is at least one shutoff valve of the rear axle brake circuit via which the rear axle brake circuit is connected to the main brake cylinder of the braking system.

5. The control device as recited in claim 2, wherein the at least one hydraulic front axle brake circuit component is at least one pressure relief valve of the front axle brake circuit via which the front axle brake circuit is connected to a brake fluid reservoir of the braking system, and wherein the at least one hydraulic rear axle brake circuit component is at least one pressure relief valve of the rear axle brake circuit via which the rear axle brake circuit is connected to the brake fluid reservoir of the braking system.

6. The control device as recited in claim 2, wherein the at least one hydraulic front axle brake circuit component is at least one pump of the front axle brake circuit which pumps brake fluid from a brake fluid reservoir of the braking system into the front axle brake circuit, and wherein the at least one hydraulic rear axle brake circuit component is at least one pump of the rear axle brake circuit which pumps brake fluid from the brake fluid reservoir of the braking system into the rear axle brake circuit.

7. The control device as recited in claim 2, wherein the at least one electric motor is a shared generator of the front axle and of the rear axle.

8. The control device as recited in claim 2, wherein the at least one electric motor includes a front axle generator of the front axle and a rear axle generator of the rear axle.

9. A recuperative braking system for a vehicle, comprising:
a front axle brake circuit associated with the front axle;
a rear axle brake circuit associated with the rear axle; and
a control device configured to:
control at least one electric motor of the vehicle, taking into account at least one provided default variable concerning a setpoint total braking torque which is predefined by a driver, in such a way that at least a front axle generator braking torque is applied to a front axle of the vehicle with the aid of the at least one electric motor;
select the maximum permissible front axle generator braking torque which may be applied to the front axle with the aid of the at least one electric motor, and select the maximum permissible rear axle generator braking torque which may be applied to a rear axle of the vehicle with the aid of the at least one electric motor, taking into account at least the default variable, and control the at least one electric motor with the aid of at least one motor control signal to perform a regenerative braking; and
control at least one hydraulic front axle brake circuit component of the front axle brake circuit associated with the front axle, and control at least one hydraulic rear axle brake circuit component of the rear axle brake circuit associated with the rear axle, with the aid of at least one hydraulic control signal and in conjunction with the regenerative braking, in such a way that a front axle brake pressure in the front axle brake circuit and a rear axle brake pressure in the rear axle brake circuit are set in such a way that a difference between (i) a predefined setpoint braking torque distribution and (ii) an actual braking torque distribution present between the front axle and the rear axle is minimized, wherein the control device is configured to maintain the setpoint braking torque distribution during the regenerative braking;

wherein the actuating device is configured to select the maximum permissible front axle generator braking torque and the maximum permissible rear axle generator braking torque such that a sum of the maximum permissible front axle generator braking torque and the maximum permissible rear axle generator braking torque is less than or equal to the setpoint total braking torque.

10. The recuperative braking system as recited in claim 9, wherein:
the front axle brake circuit is non-decoupleably connected to a main brake cylinder of the braking system together with at least one electromechanical plunger as the at least one front axle brake circuit component; and
the rear axle brake circuit is (i) decoupleably connected to the main brake cylinder via a shutoff valve, and (ii) decoupleably connected to a brake fluid reservoir of the braking system via a pressure relief valve.

11. A method for decelerating a vehicle, comprising:
performing a regenerative braking by operating at least one electric motor in generator mode for exerting a front axle generator braking torque on a front axle to decelerate the front axle, and at the same time exerting a rear axle generator braking torque on a rear axle of the vehicle, wherein the front axle generator braking torque and the rear axle generator braking torque are selected to be maximum values, taking into account at least one setpoint total braking torque, which is predefined by a driver of the vehicle; and
setting, in conjunction with the regenerative braking, (a) a front axle brake pressure in a front axle brake circuit associated with the front axle, and (b) setting a rear axle brake pressure in a rear axle brake circuit associated with the rear axle, in such a way to minimize a difference between (i) a predefined setpoint braking torque distribution and (ii) an actual braking torque distribution present between the front axle and the rear axle, wherein the setpoint braking torque distribution is maintained during the regenerative braking;
wherein the maximum permissible front axle generator braking torque and the maximum permissible rear axle generator braking torque are selected such that a sum of the maximum permissible front axle generator braking torque and the maximum permissible rear axle generator braking torque is less than or equal to the setpoint total braking torque.

12. The method as recited in claim 11, wherein each of the predefined setpoint braking torque distribution and the actual braking torque distribution present between the front axle and the rear axle represents a quotient of (i) a total front axle braking torque exerted on the front axle including the front axle generator braking torque and a front axle friction braking torque exerted on the front axle with the aid of at least one front axle wheel brake cylinder, and (ii) a total rear axle braking torque exerted on the rear axle including the rear axle generator braking torque and a rear axle friction braking torque exerted on the rear axle with the aid of at least one rear axle wheel brake cylinder.

13. The method as recited in claim 12, wherein a shared generator of the front axle and the rear axle is operated as the at least one electric motor for exerting the front axle generator braking torque on the front axle and at the same time for exerting the rear axle generator braking torque on the rear axle.

14. The method as recited in claim 12, wherein the at least one electric motor includes a front axle generator of the front axle and a rear axle generator of the rear axle.

15. The method as recited in claim 12, wherein:
the front axle brake pressure in the front axle brake circuit, which is non-decoupleably connected to a main brake cylinder of the braking system, is set with the aid of at least one electromechanical plunger of the front axle brake circuit;
the rear axle brake pressure in the rear axle brake circuit, which is decoupleably connected to the main brake cylinder via a shutoff valve, is set with the aid of at least one of (i) a pressure relief valve of the rear axle brake circuit, via which the rear axle brake circuit is connected to a brake fluid reservoir of the braking system, and (ii) at least one pump of the rear axle brake circuit, with the aid of which brake fluid is pumped from the brake fluid reservoir into the rear axle brake circuit.

16. A control device for a recuperative braking system of a vehicle, comprising:
an actuating device configured to:
control at least one electric motor of the vehicle, taking into account at least one provided default variable concerning a setpoint total braking torque which is predefined by a driver, in such a way that at least a front axle generator braking torque is applied to a front axle of the vehicle with the aid of the at least one electric motor;
select the maximum permissible front axle generator braking torque which may be applied to the front axle with the aid of the at least one electric motor, and select the maximum permissible rear axle generator braking torque which may be applied to a rear axle of the vehicle with the aid of the at least one electric motor, taking into account at least the default variable, and control the at least one electric motor with the aid of at least one motor control signal to perform a regenerative braking; and
control at least one hydraulic front axle brake circuit component of a front axle brake circuit associated with the front axle, and control at least one hydraulic rear axle brake circuit component of a rear axle brake circuit associated with the rear axle, with the aid of at least one hydraulic control signal and in conjunction with the regenerative braking, in such a way that a front axle brake pressure in the front axle brake circuit and a rear axle brake pressure in the rear axle brake circuit are set in such a way that a difference between (i) a predefined setpoint braking torque distribution and (ii) an actual braking torque distribution present between the front axle and the rear axle is minimized, wherein the actuating device is configured to maintain the setpoint braking torque distribution during the regenerative braking;
wherein the actuating device is configured to maintain the setpoint braking torque distribution only as long as a sum of braking torques exerted with the aid of the at least one electric motor, the front axle brake circuit and the rear axle brake circuit is equal to the setpoint total braking torque.

* * * * *